United States Patent
Qiu et al.

(10) Patent No.: US 9,069,681 B1
(45) Date of Patent: Jun. 30, 2015

(54) REAL-TIME LOG JOINING ON A CONTINUOUS STREAM OF EVENTS THAT ARE APPROXIMATELY ORDERED

(71) Applicant: Google Inc., Mountain View, CA (US)

(72) Inventors: Tianhao Qiu, Cupertino, CA (US); Manpreet Singh, Santa Clara, CA (US); Haifeng Jiang, Sunnyvale, CA (US); Ashish Gupta, Sunnyvale, CA (US); Sumit Das, Sunnyvale, CA (US); Venkatesh Basker, Mountain View, CA (US); Rajagopal Ananthanarayanan, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/038,060

(22) Filed: Sep. 26, 2013

Related U.S. Application Data (60) Provisional application No. 61/803,640, filed on Mar. 20, 2013.

(51) Int. Cl.
| | |
|---|---|
| *G06F 13/38* | (2006.01) |
| *G06F 15/173* | (2006.01) |
| *G06F 17/30* | (2006.01) |
| *G06F 12/08* | (2006.01) |

(52) U.S. Cl.
CPC .................................. *G06F 12/0873* (2013.01)

(58) Field of Classification Search
None
See application file for complete search history.

(56) References Cited

U.S. PATENT DOCUMENTS

| | | | | |
|---|---|---|---|---|
| 6,167,432 | A * | 12/2000 | Jiang ............................. | 709/204 |
| 6,477,619 | B1 * | 11/2002 | Fujimoto et al. .............. | 711/114 |
| 8,370,520 | B2 | 2/2013 | Kohli et al. | |
| 2003/0204474 | A1 * | 10/2003 | Capek et al. .................... | 705/64 |
| 2006/0242017 | A1 * | 10/2006 | Libes et al. ..................... | 705/14 |
| 2011/0040887 | A1 * | 2/2011 | Andrade et al. .............. | 709/231 |
| 2011/0173235 | A1 * | 7/2011 | Aman et al. .................. | 707/792 |
| 2011/0231241 | A1 * | 9/2011 | Kesari et al. ............... | 705/14.42 |
| 2011/0288928 | A1 * | 11/2011 | Patwa et al. ................ | 705/14.42 |
| 2012/0010979 | A1 * | 1/2012 | Ramer et al. ............... | 705/14.46 |
| 2012/0151253 | A1 * | 6/2012 | Horn ............................ | 714/6.22 |
| 2012/0191982 | A1 * | 7/2012 | Levin ............................ | 713/189 |

OTHER PUBLICATIONS

Abadi, Daniel J. et al., "The Design of the Borealis Stream Processing Engine," Proceedings of the 2005 CIDR Conference.
Das, Abhinandan et al., "Approximate Join Processing Over Data Streams," SIGMOD (2003) ACM 1-58113-634.

(Continued)

*Primary Examiner* — Michael Sun
(74) *Attorney, Agent, or Firm* — Lerner, David, Littenberg, Krumholz & Mentlik, LLP (57) ABSTRACT

Aspects of the disclosure relate generally to a distributed event joining system for joining primary and secondary events based on a common key. In one example, a continuous stream of primary events may be stored at a cache layer. Each primary event may be associated with a primary event key which may be used to generate an index map for the cache layer. After a time T, the stream of primary events may be sent to long term memory. The system may also receive secondary events, each associated with a primary key. The primary key may be used to identify a primary event in the cache layer. If the primary event is not available in the cache layer, the long term memory may be searched for the primary key. Paired events may then be submitted to a distributed joined event storage system.

21 Claims, 4 Drawing Sheets

(56) References Cited

OTHER PUBLICATIONS

Baker Jason et al., "Megastore: Providing Scalable, Highly Available Storage for Interactive Services," 5th Biennial Conference on Innovative Data Systems Research (2011) Asilomar, California USA.
Codd, E.F. et al., "A Relational Model of Data for Large Shared Data Banks," Communications of the ACM, (1970) 13:6.
Corbett, James C. et al., "Spanner: Google's Globally-Distributed Database," 10th USENIX Symposium on Operating Systems Design and Implementation (2012).
Dean, Jeffrey et al., "MapReduce: Simplified Data Processing on Large Clusters," OSDI Technical Program (2004) pp. 1-13.
Fitzpatrick, Brad, "Distributed Caching with Memcached," Linux Journal (2004) www.linuxjournal.com/node/7451/print.
Gedik, Bugra, et al., "Executing Stream Joins on the Cell Processor," VLDB (2007) ACM 978-1-59593-649, Vienna Austria.
Ghemawat, Sanjay et al., "The Google File System," SOSP (2003) ACM 1-58113-757.
Hammad Moustafa A. et al., "Stream Window Join: Tracking Moving Objects in Sensor-Network Databases," SSDBM (2003).
Kang, Jaewoo et al., "Evaluating Window Joins over Unbounded Streams," Proceedings of the 28th VLDB Conference, (2002) Hong Kong, China.
Karger, David et al., "Consistent Hashing and Random Trees: Distributed Caching Protocols for Relieving Hot Spots on the World Wide Web," Department of Mathematics, MIT, Cambridge (1997) http://theory.lcs.mit.edu.
Mishra, Priti et al., "Join Processing in Relational Databases," ACM Computing Surveys, (1992) 24:1.
Neumeyer, Leonardo et al., "S4: Distributed Stream Computing Platform," IEEE International Conference on Data Mining Workshops, (2010) 978-0-7695-4257.
Rao, Jun et al., "Using Paxos to Build a Scalable, Consistent, and Highly Available Datastore," VLDB Endowment (2011) 4:4.
Schneider, Fred B., "Implementing Fault-Tolerant Services Using the State Machine Approach: A Tutorial," ACM Computing Surveys, (1990) 22:4.
Chandrasekaran, Sirish et al., "Streaming Queries over Streaming Data," Proceedings of the 28th VLDB Conference, (2002) Hong Kong, China.
Teubner, Jens et al., "How Soccer Players Would do Stream Joins," SIGMOD (2011) Athens, Greece.
What is Amazon DynamoDB?—Amazon DynamoDB (2013) docs.aws.amazon.com/amazondynamodb/latest/developerguide/Introduction.html.
Xie, Junyi et al., "A Survey of Join Processing in Data Streams," (2006).
Chang, Fay et al., "Bigtable: A Distributed Storage System for Structured Data," ACM Transactions on Computer Systems (2008) 26:2 Article 4.
Zaharia, Matei et al., "Discretized Streams: A Fault-Tolerant Model for Scalable Stream Processing," Electrical Engineering and Computer Sciences University of California at Berkeley (2012) http://www.eecs.berkeley.edu/Pubs/TechRpts/2012/EECS-2012-259.html.
Xie, Junyi et al., "A Survey of Join Processing in Data Streams," (2007).
Shasa, Dennis et al., "Database Tuning: Principles, Experiments, and Troubleshooting Techniques," Morgan Kaufmann Publishers (2002) ISBN: 1558607536.
Kang, Jaewoo et al., "Evaluating Window Joins Over Unbounded Streams", University of Wisconsin-Madison, Computer Sciences Department, 2003, 12 pages.
ATG Installation and Configuration Guide, [online], [Retrieved Mar. 7, 2013] Retrieved from the Internet: <http://docs.oracle.com/cd/E23095_01/Platform.93/ATGInstallGuide/html/s08> 1 page.
Leslie Lamport, Paxos Made Simple, Nov. 1, 2001, 14 pages.
Spyros Blanas, Jignesh M. Patel, Vuk Ercegovac, Jun Rao, Eugene J. Shekita and Yuanyuan Tian, A Comparison of Join Algorithms for Log Processing in MapReduce, 12 pages, 2010.
Spyros Blanas, Jignesh M. Patel, Vuk Ercegovac, Jun Rao, Eugene J. Shekita and Yuanyuan Tian, A Comparison of Join Algorithms for Log Processing in MapReduce, Power Point Presentation, 17 pages, 2010.
Tushar Chandra, Robert Griesemer, and Joshua Redstone, Paxos Made Live—An Engineering Perspective, Jun. 26, 2007, 16 pages.

* cited by examiner

REAL-TIME LOG JOINING ON A CONTINUOUS STREAM OF EVENTS THAT ARE APPROXIMATELY ORDERED

CROSS REFERENCE TO RELATED APPLICATIONS

The present application claims the benefit of the filing date of U.S. Provisional Patent Application No. 61/803,640 filed Mar. 20, 2013, the entire disclosure of which is hereby incorporated herein by reference.

BACKGROUND

Log joining systems may attempt to join one source of secondary events with another source of primary events. In one example, primary events may include search queries, while secondary events may include user clicks on advertisements. Every primary event is uniquely identified by a key, and every secondary event is associated with a key for a corresponding primary event. The purpose of log joining is to locate the corresponding primary event for every secondary event based on the primary key.

In a non-continuous system, the joining may be performed in sequential batches. This can easily be achieved by a series of massive map-reduces having a mapper component and a reducer component. Both secondary and primary events may be fed into the mapper component, and the mapper may emit secondary events keyed on the common primary event ID. The reducer, in turn, can take the joining decision and output the joined logs. However, such a configuration may not scale well in a larger system having a continuous stream of events.

SUMMARY

One aspect of the disclosure provides a method. The method includes receiving a continuous stream of primary events, each associated with a corresponding primary event key; storing the received primary events in a short term memory; generating, by a processor, an index map based on the received primary events currently stored in the short term memory; after a time T has passed, storing the received primary events in a long term memory; receiving a secondary event associated with a particular primary key; and using the index map to determine whether the particular primary event key is included in the short term memory.

In one example, the method also includes, when the particular primary event key is included in the short term memory, joining the secondary event with the primary event that is associated with the primary event key in the short term memory and sending the joined primary event and secondary event to a joined event storage system. In another example, the method also includes, when the particular primary event key is not included in the short term memory, determining whether the particular primary event key is included in the long term memory. In this example, the method also includes when the particular primary event key is included in the long term memory, joining the secondary event with the primary event that is associated with the primary event key in the short term memory and sending the joined primary event and secondary event to a joined event storage system.

In another example, the method also includes receiving a stream of secondary events such that the secondary event associated with the particular primary key is received as part of the stream of secondary events. In a further example, using the index map to determine whether the particular primary event key is included in the short term memory includes determining a maximum skew value for the index map; determining an offset value for the particular primary event key based on a value of the primary event key and the maximum skew value; and using the offset value to determine whether the particular primary event key is included in the short term memory. In another example, using the index map to determine whether the particular primary event key is included in the short term memory includes determining a maximum skew values for the index map; seeking to an offset value returned by getting lower bound of a value of the primary event key minus the maximum skew value; and using the offset value to determine whether the particular primary event key is included in the short term memory.

Another aspect of the disclosure provides system. The system includes a cache layer for storing a continuously received stream of primary events for a time T. Each primary event of the continuously received stream of primary events having a corresponding primary event key. The system also includes a long term memory for storing the continuously received stream of primary events after a time T and a processor. The processor is configured to generate an index map based on the continuously received primary events currently stored in the short term memory; receiving a secondary event associated with a particular primary key; and using the index map to determine whether the particular primary event key is included in the short term memory.

In one example, the processor is also configured to, when the particular primary event key is included in the short term memory, join the secondary event with the primary event that is associated with the primary event key in the short term memory and to send the joined primary event and secondary event to a joined event storage system. In another example, the processor is also configured to, when the particular primary event key is not included in the short term memory, determine whether the particular primary event key is included in the long term memory. In this example, the processor is also configured to, when the particular primary event key is included in the long term memory, join the secondary event with the primary event that is associated with the primary event key in the long term memory and to send the joined primary event and secondary event to a joined event storage system.

In another example, the processor is also configured to receive a stream of secondary events such that the secondary event associated with the particular primary key is received as part of the stream of secondary events. In a further example, the processor is also configured to use the index map to determine whether the particular primary event key is included in the short term memory by determining a maximum skew value for the index map; determining an offset value for the particular primary event key based on a value of the primary event key and the maximum skew value; and using the offset value to determine whether the particular primary event key is included in the short term memory. In another example, the processor is also configured to use the index map to determine whether the particular primary event key is included in the short term memory by determining a maximum skew values for the index map; seeking to an offset value returned by getting lower bound of a value of the primary event key minus the maximum skew value; and using the offset value to determine whether the particular primary event key is included in the short term memory.

A further aspect of the disclosure provides a non-transitory tangible computer-readable storage medium on which computer readable instructions of a program are stored. The instructions, when executed by a processor, cause the processor to perform a method. The method includes receiving a continuous stream of primary events, each associated with a corresponding primary event key; storing the received primary events in a short term memory; generating an index map based on the received primary events currently stored in the short term memory; after a time T has passed, storing the received primary events in a long term memory; receiving a secondary event associated with a particular primary key; and using the index map to determine whether the particular primary event key is included in the short term memory.

In one example, the method also includes, when the particular primary event key is included in the short term memory, joining the secondary event with the primary event that is associated with the primary event key in the short term memory and sending the joined primary event and secondary event to a joined event storage system. In another example, the method also includes, when the particular primary event key is not included in the short term memory, determining whether the particular primary event key is included in the long term memory. In this example, the method also includes when the particular primary event key is included in the long term memory, joining the secondary event with the primary event that is associated with the primary event key in the short term memory and sending the joined primary event and secondary event to a joined event storage system.

In another example, the method also includes receiving a stream of secondary events such that the secondary event associated with the particular primary key is received as part of the stream of secondary events. In a further example, using the index map to determine whether the particular primary event key is included in the short term memory includes determining a maximum skew value for the index map; determining an offset value for the particular primary event key based on a value of the primary event key and the maximum skew value; and using the offset value to determine whether the particular primary event key is included in the short term memory. In another example, using the index map to determine whether the particular primary event key is included in the short term memory includes determining a maximum skew values for the index map; seeking to an offset value returned by getting lower bound of a value of the primary event key minus the maximum skew value; and using the offset value to determine whether the particular primary event key is included in the short term memory.

DETAILED DESCRIPTION

Aspects of the disclosure relate generally to a distributed event joining system for joining primary and secondary events based on a common key. As an example, a continuous stream of primary events may be received. Each primary event may be associated with a primary event key. The stream of primary events may be stored in short-term memory. An index map for the primary events of the short-term memory may be generated using the primary event keys. After a predetermined period of time, the stream of primary events may be sent to a long term memory for storage. This process may repeat continuously as new primary events are received from the continuous stream of primary events.

A continuous stream of secondary events, each associated with a primary event key, may also be received. A secondary event may be selected. Whether the primary event key associated with the selected secondary event is included in the short-term memory may be determined using the index map generated as described above. This may be repeated several times. If the primary event key is included in the short-term memory, the primary event may be joined with the secondary event and sent to a joined event storage system. Another secondary event may be selected and used as described above.

If the primary event key is not included in the short-term memory, whether the primary event key associated with the selected secondary event is included in the long-term memory may be determined. Again, this may be repeated several times. If the primary event key is included in the long-term memory, the primary event may be joined with the secondary event and sent to a joined event storage system. If the primary event key is not included in the long-term memory, the pairing may fail, and another secondary event may be selected. Again, this process may repeat continuously as new primary events are received from the continuous stream of primary events.

Figure 1:
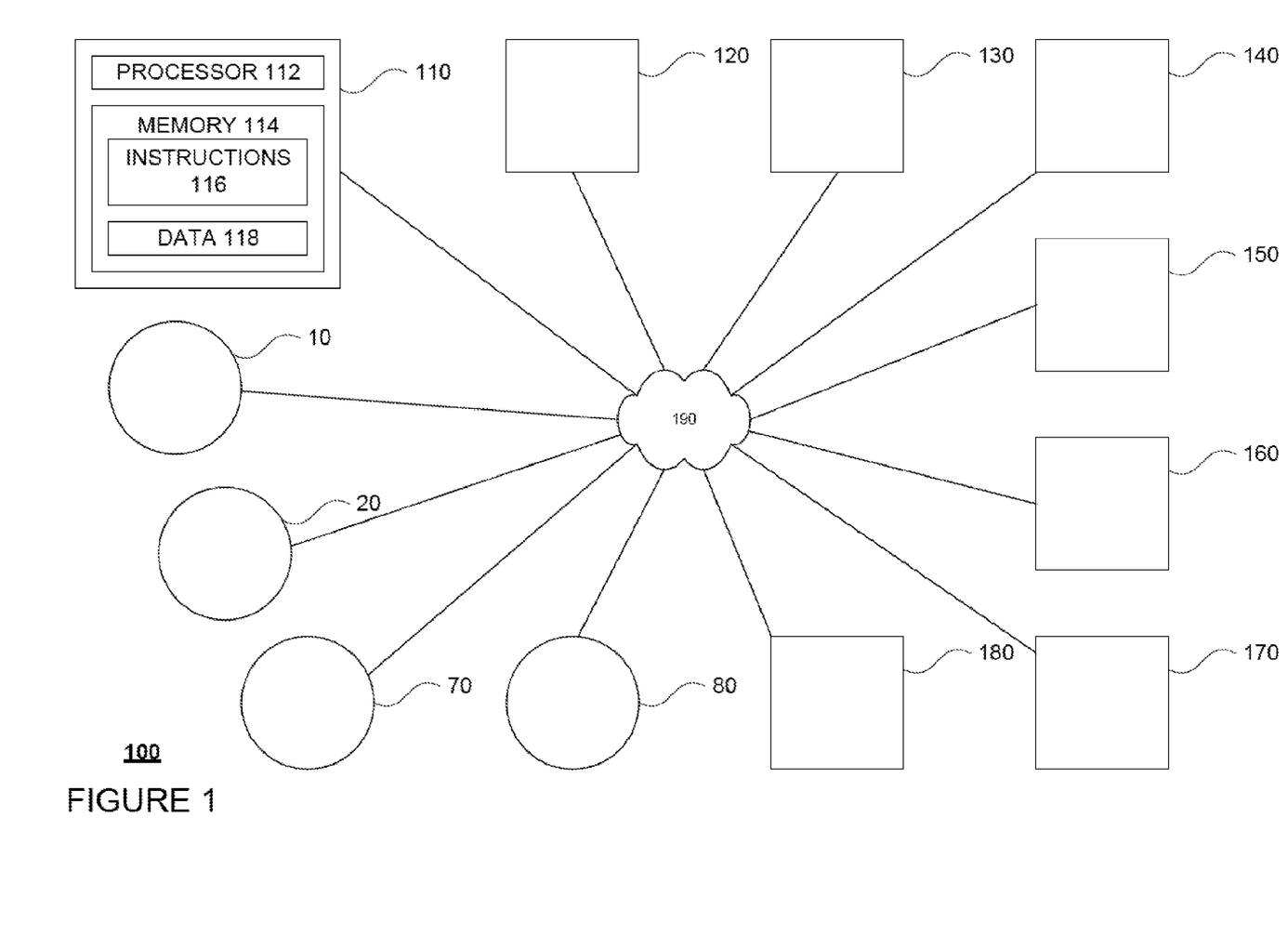
FIG. 1 is a functional diagram of a system in accordance with aspects of the disclosure.
Figure 2:
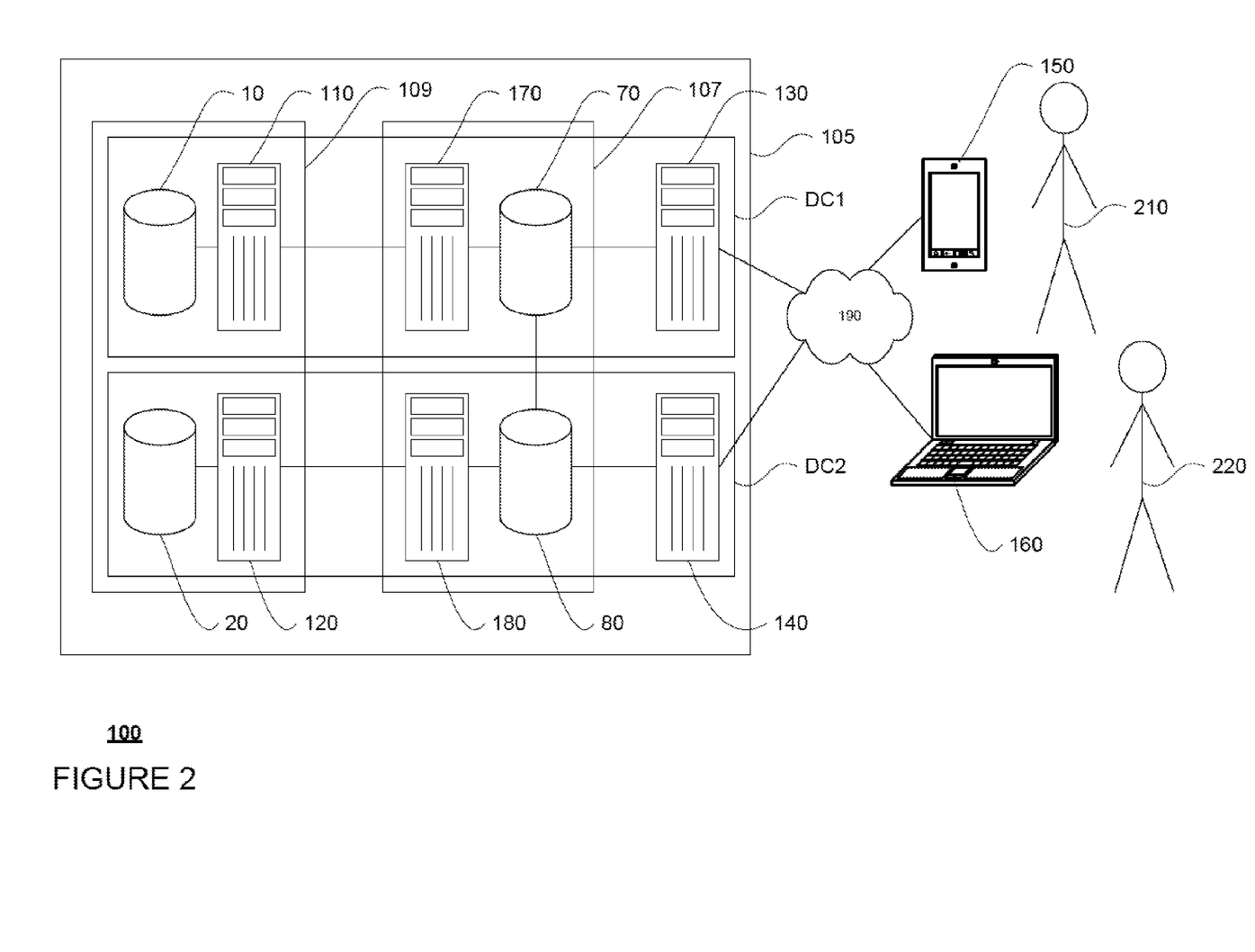
FIG. 2 is a pictorial diagram of the system of FIG. 1.

FIGS. 1-2, depict a system 100, which is used herein as an example system in which the event joiner system described herein may be implemented. It should not be considered as limiting the scope of the disclosure or the usefulness of the features described herein. In this example, system 100 can include computers 110, 120, 130, 140, 150, 160, 170, and 180 and databases 10, 20, 70, and 80. Computers 110 and 120 can contain a processor 112, memory 114 and other components typically present in general purpose computers. Memory 114 of computer 110 can store information accessible by processor 112, including instructions 116 that can be executed by the processor 112.

Memory can also include data 118 that can be retrieved, manipulated or stored by the processor. The memory can be of any type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computer language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computer-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The processor 112 can be any conventional processor, such as commercially available CPUs. Alternatively, the processor can be a dedicated device such as an ASIC or other hardware-based processor. Although FIG. 1 functionally illustrates the processor, memory, and other elements of computer 110 as being within the same block, the processor, computer, or memory can actually comprise multiple processors, computers, or memories that can or cannot be stored within the same physical housing. For example, memory can be a hard drive or other storage media located in a housing different from that of computer 110. Accordingly, references to a processor, computer, or memory will be understood to include references to a collection of processors, computers, or memories that can or cannot operate in parallel.

The computer 110 can be at one node of a network 190 and capable of directly and indirectly communicating with other nodes, such as computers 130, 150, 160, 170 as well as databases 10 and 70, of the network. Similarly, computer 120 can be at another node of the network and capable of directly and indirectly communicating with other nodes, such as computers 140, 150, 160, and 180 as well as databases 20 and 80. The network 190 and intervening nodes described herein, can be interconnected using various protocols and systems, such that each can be part of the Internet, World Wide Web, specific intranets, wide area networks, or local networks. These can use standard communications protocols or those proprietary to one or more companies, Ethernet, WiFi and HTTP, and various combinations of the foregoing.

Each of computers 120, 130, 140, 150, 160, 170, 180 can be configured similarly to the computer 110, with a processor, memory, instructions, and data, similar to processor 112, memory 114, instructions 116, and data 118. As an example, computers 110 and 120 may be key registry servers, computers 170 and 180 may be worker computers, computers 130 and 140 may be web servers, and computers 150 and 160 may be client devices. As such, key registry server 110, worker computer 170, web server 130, and databases 10 and 70 may operate at a first data center DC1 (shown in FIG. 2) at a first geographic location, while key registry server 120, worker computer 180, web server 140, and databases 20 and 80 may operate at a second data center DC2 (shown in FIG. 2) at a second geographic location remote from the first geographic location of the first data center. In this regard, the first and second datacenters may be considered a geographically distributed computing system 105 (shown in FIG. 2). Although not shown, the computing system many more datacenters.

Although FIGS. 1 and 2 depict key registry servers 110 and 120 and worker computers 170 and 180 as singular devices, these devices may each represent many key registry servers or worker computers. Similarly, web servers 130 and 140 may also comprise many computers, e.g., a load balanced server farm, that exchange information with different nodes of network 190 for the purpose of receiving, processing and transmitting data to the client devices 150 and 160. In this instance, the client devices will typically still be at different nodes of the network than any of the computers of servers 110, 120, 130 or 140 or worker computers 170 or 180.

Each client device 150 and 160 can be a personal computer, intended for use by a user 210 or 220, having all the components normally found in a personal computer such as a central processing unit (CPU), display device, CD-ROM, hard drive, user inputs, speakers, modem and/or network interface device, and all of the components used for connecting these elements to one another. Moreover, client devices in accordance with the systems and methods described herein can comprise any device capable of processing instructions and transmitting data to and from humans and other computers including general purpose personal computers, PDAs, network computers lacking local storage capability, set-top boxes for televisions, wireless-enabled PDA, hand-held or in-car navigation device, tablet PC, netbook, a cellular phone capable of obtaining information using the Internet, and other networked devices.

As described in more detail below, databases 70 and 80 may store logs of event information reported by web servers 130 and 140. The logs may include input from continuous data streams including a primary data stream of primary keys or primary event identifiers, timestamps, and other associated information. This log data may be accessed by worker computers 170 and 180 arranged as a distributed event joining system 107 of FIG. 2.

Figure 3:
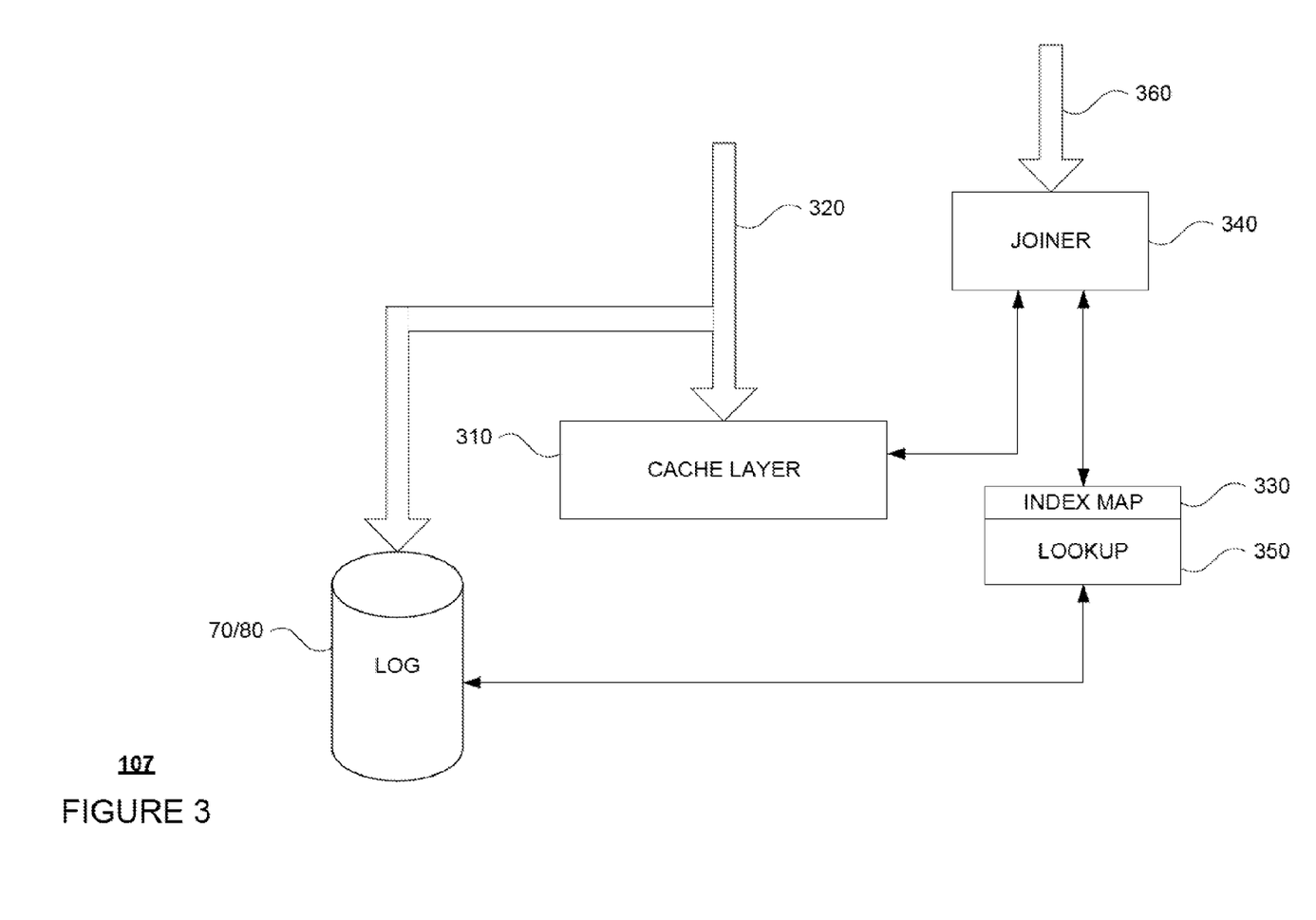
FIG. 3 is an example diagram of an event joining system in accordance with aspects of the disclosure.

An example of a configuration for the distributed joining system 107 is shown in more detail in FIG. 3. In this example, the joining system may further include a cache layer 310 for the primary event stream 320. The cache layer may be configured as one or more cache server computer, again configured similarly to computer 110, with a processor and memory storing instructions and data similar to processor 112, memory 114, instructions 116, and data 118. The cache layer 310 may store primary event information and generate an index map 330 as described in more detail below.

In this example, the instructions of worker computers 170 and 180 may include a joiner tool 340 and a lookup tool 350. As described in more detail below the joiner tool may be used to join primary and secondary events by common keys, here, event IDs. The lookup tool may be used to query the databases 70 and 80 for primary keys.

Databases 10 and 20 may include logs that store joined keys or event IDs. The logs may include primary keys or primary events IDs that have been paired with secondary keys or secondary event IDs. These logs may be managed by the key registry servers 110 and 120 as a distributed joined event storage system, such as system 109 of FIG. 2.

Although certain advantages are obtained when information is transmitted or received as noted above, other aspects of the subject matter described herein are not limited to any particular manner of transmission of information. For example, in some aspects, information can be sent using a medium such as a disk, tape or CD-ROM. Yet further, although some functions are indicated as taking place on a single computer having a single processor, various aspects of the subject matter described herein can be implemented by a multiple of computers, for example, communicating information over network 190.

In addition to the operations described below and illustrated in the figures, various operations will now be described. It should also be understood that the following operations do not have to be performed in the precise order described below. Rather, various steps can be handled in a different order or simultaneously. Steps can also be omitted unless otherwise stated.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server, such as web servers 130 or 140.

As an example of the operation aspects of system 100, when a client device, such as client device 150, submits a search query to web server 130, web server 130 may respond to the request by providing information such as a web page and one or more advertisements for display to the user 210. This query may be considered a primary event. Web server 130 may also generate a key, for example here an event identifier (event ID). In this example, the query event may be considered a primary event, and the event ID a primary event identifier (primary event ID). The primary event ID may be a query identifier (query ID) for the query. The web server 130 may also send the event information to the distributed event joiner system 107. For each advertisement, the primary event information may include the query ID, a timestamp, an advertiser identifier, auction data for the advertisement, etc.

After receiving the web page and advertisements, user 210 may click on one of the advertisements. The click may be considered a secondary event. The click event may be sent to web server 130 which may direct the client device to the advertiser's web site. The click event may also be given a key or event ID. In this example, the event ID would be a secondary event identifier (secondary event ID) and may be a click identifier (click ID). The click ID may be associated with the corresponding query ID as well as other information used to bill the advertiser as secondary event information. The secondary event information may also be sent to the distributed event joiner system 107.

As the web servers 130 and 150 receive event information, for example for user queries and user clicks, over time, these different types of event information may be considered two continuous event streams. Although the present disclosure relates to click and query event streams, such systems may be used to join many different types of event streams. For example, some advertisement serving systems may provide advertisements and results as a user is typing a query, by making assumptions about what the user is searching for rather than waiting for a specific search request from the user. Thus, it may be necessary to join the user's actions, such as clicking on an advertisement with the corresponding query for which the system assumed was being searched.

Again, FIG. 3 is an example of a configuration for the distributed joining system 107. In this example, primary event information 320 and secondary event information 360 may be received as input to the distributed event joiner system. The event information may be received approximately in the timestamp order in continuous streams 320 and 360. The number of primary events may be much greater than the number of secondary events. For example, for every advertisement shown, only a portion may actually be associated with a click event. In addition, a majority of joining requests from the secondary stream may be looking for recent events in the primary stream.

As shown in FIG. 3, primary event information 320 may be directly streamed into the cache layer 310. As noted above, the cache layer may store primary event information for up to an amount of time T based on the timestamp associated with each primary event. After T time has passed, primary event information may be moved (copied and overwritten) to the databases 70 and 80 on a first in, first out basis. The value of T may be a relatively short amount of time, such as a few minutes, or significantly longer such as an hour or more.

As the primary event data stream is received by the cache layer 310, the cache layer builds an index map 320 in real time. The index map may keep track of a set of (key, offset) pairs. In the example above, the key may be a primary event ID. Each entry can be thought of as a vertex in a linear, monotonically increasing function. A given entry (K, d) may imply that all events before offset "d" (exclusive) associated with the primary key "K" have keys no greater than the value of K, as the record at offset "d" has a key slightly larger than the value of k. The offset between adjacent keys may differ for different adjacent keys. The index map may be sparse, such that the keys do not have to be continuous in the index. Entries may be deleted if they are too close to existing vertices (i.e. their offsets differ by less than a threshold). As the index is written on the fly as events are read, it may contain redundant index entries. The threshold can be used to optimize the size of the index. This may both save space and improve the time for lookup of keys.

The secondary event information is inputted into the joiner tool 340 in order to identify corresponding primary event information. In this regard, the joiner tool may try identifying primary event information using a particular primary key of the secondary event information. In this regard, the joiner tool may first search the cache layer 310 in order to determine whether a particular primary key exists. For example, the joiner tool 340 may receive secondary event information identifying a primary event ID, "K."

Specifically, the index map may be searched to find the particular key "K." The max_skew value may then be subtracted from "K" to obtain an offset value. The joiner tool then seeks to the offset value returned by getting lower bound of K minus max_skew in the index map, or the first entry that compares greater than K-max_skew. The event information at the returned offset value may be read, and a new entry is added to the index map for the returned offset value.

The max_skew value may again be subtracted from "K" to obtain an offset value. However, because the new entry was added to the index map for the previously returned offset value, a different offset may be returned by getting lower bound of K minus the max_skew in the index map. The record at the offset value may be read and another new entry may be added to the index map.

This may continue until the same offset value is returned twice. This may be an indication that the stream of primary events that have been seen so far is positioned as closely as possible before the start of the event containing key K (if any). Once this occurs, a linear search may begin by ready keys sequentially until the key K may be found or a key greater than K plus max_skew is found. If a key greater than K plus max_skew may be found, this may indicate that the key K does not exist in the cache layer 107.

When a key does not exist in the cache layer 107, the joiner tool 340 may use the lookup tool 350 to query the log data of databases 70 and 80. In this regard, the logs of databases 70 and 80 may play the role of a catch-all. Thus, older primary event information may still be available for pairing until it reaches an expiration date T2 past which a pairing with a secondary event would be unlikely, for example a few days. The lookup tool may have to perform multiple disk reads of databases 70 or 80 to find an event as they system may seek and read at multiple disk offsets and the final event may need sequential reads. For example, if a key is not found, then the system may retry after some duration based on T2. However, this may be cheaper than cache-layer lookups, which can be costly in terms of RAM, but may have higher latency and processing loads.

Figure 4A:
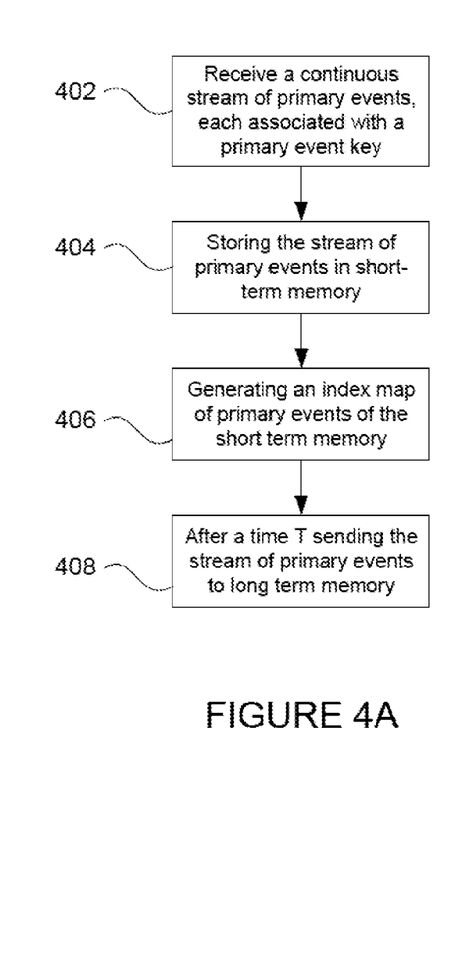
FIGS. 4A and 4B are example flow diagrams in accordance with aspects of the disclosure.
Figure 4B:
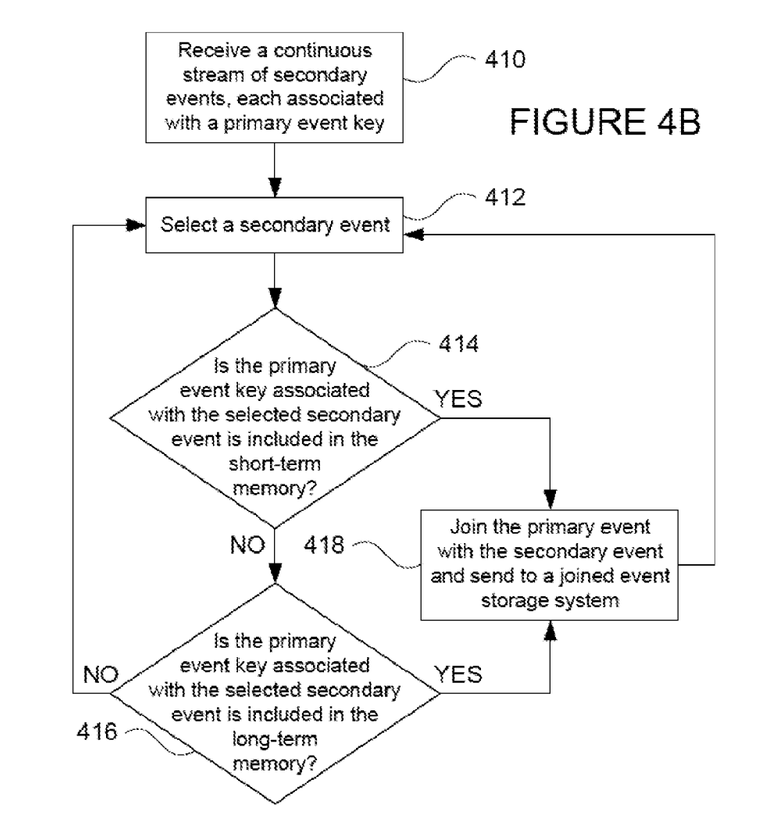

FIGS. 4A and 4B are example flow diagrams for a distributed event joining system including some of the features described above. For example, FIG. 4A is an example flow diagram for the processes that may occur at cache layer 310. First, a continuous stream of primary events is received at block 402. Each primary event is associated with a primary event key. The stream of primary events is stored in short-term memory at block 404. An index map for the primary events of the short-term memory is generated using the primary event keys at block 406. After a time T, the stream of primary events is sent to long term memory. The blocks of FIG. 4A may repeat continuously as new primary events are received from the continuous stream of primary events.

In the example of FIG. 4B, is an example flow diagram for the processes that may be performed by the worker computers. A continuous stream of secondary events, each associated with a primary event key, is received at block 410. A secondary event is selected at block 412. Next, whether the primary event key associated with the selected secondary event is included in the short-term memory is determined using the index map (generated at block 406 of FIG. 4B) at block 414. This block may be repeated several times before progressing to the next block. If the primary event key is included in the short-term memory, the primary event is joined with the secondary event and sent to a joined event storage system at block 414, and another secondary event is selected at block 412.

If the primary event key is not included in the short-term memory, whether the primary event key associated with the selected secondary event is included in the long-term memory is determined at block 416. Again, this block may be repeated several times before progressing to the next block. If the primary event key is included in the long-term memory, the primary event is joined with the secondary event and sent to a joined event storage system at block 414. If the primary event key is not included in the long-term memory, the pairing may fail, and another secondary event is selected at block 412. Again, the blocks of FIG. 4B may repeat continuously as new primary events are received from the continuous stream of primary events.

One advantage of the cache layer 310 is relatively low latency and relatively low disk-load. As a result of this, the system 310 can even retry looking up a key in the cache layer multiple times before giving up and going to disk-based lookup system (for example, at databases 70 or 80). This multiple reply may be cheaper in terms of latency and processing loads than the cost of disk seeks on the databases. It may also provide some extra time for the cache layer 310 to catch up as new secondary event information is received.

Because the cache layer handles the majority of recent event lookups, this may add up to a tremendous savings in processing power, and thus, make the system scalable. For example, in a joining system for query and click events, if the cache layer is configured to store primary event information for up to an hour, this may lead to up to 90% of lookups being addressed at the cache layer.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving a continuous stream of primary events corresponding to search queries submitted by one or more users, each received primary event being associated with a corresponding primary event key identifying a particular search query;
storing the received primary events in a short term memory;
generating, by a processor, an index map that tracks primary event keys of any received primary events currently stored in the short term memory;
after a time T has passed, storing the received primary events in a long term memory;
receiving a secondary event corresponding to an advertisement selected by one of the one or more users, the secondary event being associated with a particular primary key; and
using the index map to determine whether the particular primary event key is included in the short term memory.

2. The method of claim 1, further comprising:
when the particular primary event key is included in the short term memory, joining the secondary event with the primary event that is associated with the primary event key in the short term memory; and
sending the joined primary event and secondary event to a joined event storage system.

3. The method of claim 1, further comprising when the particular primary event key is not included in the short term memory, determining whether the particular primary event key is included in the long term memory.

4. The method of claim 3, further comprising:
when the particular primary event key is included in the long term memory, joining the secondary event with the primary event that is associated with the primary event key in the short term memory; and
sending the joined primary event and secondary event to a joined event storage system.

5. The method of claim 1, further comprising receiving a stream of secondary events such that the secondary event associated with the particular primary key is received as part of the stream of secondary events.

6. The method of claim 1, wherein using the index map to determine whether the particular primary event key is included in the short term memory includes:
determining a maximum skew value for the index map;
determining an offset value for the particular primary event key based on a value of the primary event key and the maximum skew value; and
using the offset value to determine whether the particular primary event key is included in the short term memory.

7. The method of claim 1, using the index map to determine whether the particular primary event key is included in the short term memory includes:
determining a maximum skew value for the index map;
seeking to an offset value returned by getting lower bound of a value of the primary event key minus the maximum skew value; and
using the offset value to determine whether the particular primary event key is included in the short term memory.

8. A system comprising:
a cache layer for storing a continuously received stream of primary events for a time T, each primary event of the continuously received stream of primary events corresponding to a search queries submitted by one or more users, each primary event of the continuously received stream of primary events having a corresponding primary event key identifying a particular search query;

a long term memory for storing the continuously received stream of primary events after a time T;

a processor configured to:

generate an index map that tracks primary event keys of the continuously received primary events currently stored in the short term memory;

receiving a secondary event corresponding to an advertisement selected by one of the one or more users, the secondary event being associated with a particular primary key; and using the index map to determine whether the particular primary event key is included in the short term memory.

9. The system of claim 8, wherein the processor is further configured to:

when the particular primary event key is included in the short term memory, join the secondary event with the primary event that is associated with the primary event key in the short term memory; and send the joined primary event and secondary event to a joined event storage system.

10. The system of claim 8, wherein the processor is further configured to, when the particular primary event key is not included in the short term memory, determine whether the particular primary event key is included in the long term memory.

11. The system of claim 10, wherein the processor is further configured to:

when the particular primary event key is included in the long term memory, join the secondary event with the primary event that is associated with the primary event key in the long term memory; and send the joined primary event and secondary event to a joined event storage system.

12. The system of claim 8, wherein the processor is further configured to receive a stream of secondary events such that the secondary event associated with the particular primary key is received as part of the stream of secondary events.

13. The system of claim 8, wherein the processor is further configured to use the index map to determine whether the particular primary event key is included in the short term memory by:

determining a maximum skew value for the index map;

determining an offset value for the particular primary event key based on a value of the primary event key and the maximum skew value; and using the offset value to determine whether the particular primary event key is included in the short term memory.

14. The system of claim 8, wherein the processor is further configured to use the index map to determine whether the particular primary event key is included in the short term memory by:

determining a maximum skew value for the index map;

seeking to an offset value returned by getting lower bound of a value of the primary event key minus the maximum skew value; and using the offset value to determine whether the particular primary event key is included in the short term memory.

15. A non-transitory tangible computer-readable storage medium on which computer readable instructions of a program are stored, the instructions, when executed by a processor, cause the processor to perform a method, the method comprising method comprising:

receiving a continuous stream of primary events corresponding to search queries submitted by one or more users, each received primary event being associated with a corresponding primary event key identifying a particular search query;

storing the received primary events in a short term memory;

generating an index map that tracks primary event keys of any received primary events currently stored in the short term memory;

after a time T has passed, storing the received primary events in a long term memory;

receiving a secondary event corresponding to an advertisement selected by one of the one or more users, the secondary event being associated with a particular primary key; and using the index map to determine whether the particular primary event key is included in the short term memory.

16. The medium of claim 15, wherein the method further comprises when the particular primary event key is included in the short term memory, joining the secondary event with the primary event that is associated with the primary event key in the short term memory; and sending the joined primary event and secondary event to a joined event storage system.

17. The medium of claim 15, wherein the method further comprises when the particular primary event key is not included in the short term memory, determining whether the particular primary event key is included in the long term memory.

18. The medium of claim 17, wherein the method further comprises:

when the particular primary event key is included in the long term memory, joining the secondary event with the primary event that is associated with the primary event key in the short term memory; and sending the joined primary event and secondary event to a joined event storage system.

19. The medium of claim 15, wherein the method further comprises receiving a stream of secondary events such that the secondary event associated with the particular primary key is received as part of the stream of secondary events.

20. The medium of claim 15, wherein the method further comprises using the index map to determine whether the particular primary event key is included in the short term memory by:

determining a maximum skew value for the index map;

determining an offset value for the particular primary event key based on a value of the primary event key and the maximum skew value; and using the offset value to determine whether the particular primary event key is included in the short term memory.

21. The medium of claim 15, wherein the method further comprises using the index map to determine whether the particular primary event key is included in the short term memory by:

determining a maximum skew value for the index map;

seeking to an offset value returned by getting lower bound of a value of the primary event key minus the maximum skew value;

using the offset value to determine whether the particular primary event key is included in the short term memory.

* * * * *